US 010099942B2

(12) United States Patent
Kellam et al.

(10) Patent No.: US 10,099,942 B2
(45) Date of Patent: Oct. 16, 2018

(54) SYSTEMS AND METHODS OF ELIMINATING FILTER AIR LOCKS

(71) Applicant: ZERO TECHNOLOGIES, LLC, Trevose, PA (US)

(72) Inventors: Doug Kellam, Oak Brook, IL (US); Rajan Rajan, Bensalem, PA (US); Liu Guang Wei, Cixi (CN)

(73) Assignee: ZERO TECHNOLOGIES, LLC, Trevose, PA (US)

( * ) Notice: Subject to any disclaimer, the term of this patent is extended or adjusted under 35 U.S.C. 154(b) by 178 days.

(21) Appl. No.: 14/775,211

(22) PCT Filed: Mar. 14, 2014

(86) PCT No.: PCT/US2014/027663
§ 371 (c)(1),
(2) Date: Sep. 11, 2015

(87) PCT Pub. No.: WO2014/152724
PCT Pub. Date: Sep. 25, 2014

(65) Prior Publication Data
US 2016/0023918 A1    Jan. 28, 2016

Related U.S. Application Data

(60) Provisional application No. 61/789,995, filed on Mar. 15, 2013.

(51) Int. Cl.
*C02F 1/28* (2006.01)
*C02F 1/00* (2006.01)
(Continued)

(52) U.S. Cl.
CPC ............ *C02F 1/003* (2013.01); *B01D 24/007* (2013.01); *B01D 24/22* (2013.01); *B01D 27/02* (2013.01);
(Continued)

(58) Field of Classification Search
CPC ...... B01D 24/007; B01D 24/04; B01D 24/12; B01D 24/22; B01D 27/02; C02F 1/003;
(Continued)

(56) References Cited

U.S. PATENT DOCUMENTS 2,605,901 A *  8/1952  Morrison ............... B01D 27/00
                                                       210/266
5,798,040 A    8/1998  Liang
(Continued)

FOREIGN PATENT DOCUMENTS

DE         3936611 A1 *  5/1991  .......... B01D 24/007
DE        19958648 A1     6/2001
WO     20041014803 A1     2/2004

OTHER PUBLICATIONS

International Preliminary Report on Patentability in International Application No. PCT/US2014/027663, dated Sep. 15, 2015.
(Continued)

*Primary Examiner* — Matthew O Savage
(74) *Attorney, Agent, or Firm* — J.A. Lindeman & Co., PLLC

(57) ABSTRACT

Systems and methods of eliminate filter air locks by maintaining a constant water table at the water head layer of the filter. The constant water table eliminates air locks in the filter as the filter drains. Water flows from the water head layer through a filtration medium in a filter cartridge, and the filtered water is output from a water outlet at the top of the cartridge. For a water table retention filter, where the water (or other liquid) being filtered, is re-directed to the top of the filter to the water head layer to avoid drawing air into the filter. Unfiltered water drains down the center of the filter to the water head layer and then flows up through the filter and is directed out near or at the top of the filter.

16 Claims, 7 Drawing Sheets

(51) Int. Cl.
*B01D 24/00* (2006.01)
*B01D 27/02* (2006.01)
*B01D 24/22* (2006.01)
*C02F 1/42* (2006.01)
*C02F 1/66* (2006.01)
*C02F 1/70* (2006.01)
*C02F 101/00* (2006.01)
*C02F 101/12* (2006.01)
*C02F 101/30* (2006.01)

(52) U.S. Cl.
CPC ............... *C02F 1/283* (2013.01); *C02F 1/42* (2013.01); *C02F 1/66* (2013.01); *C02F 1/705* (2013.01); *C02F 2001/427* (2013.01); *C02F 2101/006* (2013.01); *C02F 2101/12* (2013.01); *C02F 2101/30* (2013.01); *C02F 2201/006* (2013.01); *C02F 2307/02* (2013.01); *C02F 2307/04* (2013.01)

(58) Field of Classification Search
CPC ...... C02F 1/283; C02F 1/42; C02F 2001/427; C02F 1/66; C02F 1/705; C02F 2201/006; C02F 2307/02; C02F 2307/04; C02F 2101/006; C02F 2101/12; C02F 2101/30
See application file for complete search history.

(56) References Cited

U.S. PATENT DOCUMENTS

| | | | |
|---|---|---|---|
| 6,159,363 A | 12/2000 | Collins et al. | |
| 6,197,193 B1* | 3/2001 | Archer | C02F 1/003 210/266 |
| 6,387,260 B1 | 5/2002 | Pimenov et al. | |
| 6,454,941 B1* | 9/2002 | Cutler | C02F 1/003 210/266 |
| 2002/0117436 A1* | 8/2002 | Rajan | C02F 1/003 210/266 |
| 2006/0091075 A1 | 5/2006 | Cote et al. | |
| 2010/0012590 A1 | 1/2010 | Slark | |

OTHER PUBLICATIONS

International Search Report and Written Opinion in International Application No. PCT/US2014/027663, dated Sep. 3, 2015.
English Abstract of DE 19958648.

* cited by examiner

SYSTEMS AND METHODS OF ELIMINATING FILTER AIR LOCKS

CROSS-REFERENCE TO RELATED APPLICATION

This application claims benefit of priority of U.S. Provisional Patent Application Ser. No. 61/789,995 filed on Mar. 15, 2013, the entire disclosure of which is incorporated herein by reference.

TECHNICAL FIELD

This technology relates to systems and methods to control the flow and velocity of fluids in a chamber. More particularly, the technology relates to systems, devices, and methods of eliminating air locks in chambers when filtering fluids.

BACKGROUND

Water filtration systems can include pour-through pitcher systems, countertop systems, and filtration cartridge systems. Pour-through pitcher systems can include an upper reservoir for receiving unfiltered water, a lower reservoir for receiving and storing filtered water, and a filtration cartridge with an inlet at its top and outlet at its bottom, through which water flows from the upper reservoir is filtered and travels to the lower reservoir.

Countertop or standalone systems can include a larger filtered water tank with a spigot for draining filtered water into a glass or other container. Pitcher and countertop systems use gravity to move the unfiltered water in the top reservoir through a water filtration cartridge and into the lower reservoir where the filtered water is stored until it is used.

Water filtration cartridges often used in gravity flow systems often include a sieve system and a housing. The housing is filled with filtration media, and the sieve system is sealed to the barrel. The filtration media is usually granular, such as activated carbon. Other components can be combined to enhance water filtration capability, such as ion exchange resin, zeolite, ceramics, and the like.

A problem associated with using granular filtration media in gravity flow cartridges is that air gets trapped in-between the particles of filtration media and in the headspace of the cartridge housing. Air can enter into the cavities of the water flow path when the filter is not used for a period of time. When the filter is again used to filter the liquid, the heavier liquid traps the lighter air in the cavities of the filter, especially close to the underside of the filtration media. This "headspace" area between the fill line of the filtration media and the underside of the filtration media provides a back pressure and a loss of filtration surface area. Both "air lock" effects contribute to the reduction in the flow rate of the liquid through the filter. This air must be vented or otherwise removed from the cartridge as water is filtered or water flow will be slow or completely stop.

SUMMARY

The claimed invention includes example embodiments of water table retention filters that prevent clogging due to air-locks. The air-locks can be created in the filters when air is drawn into the top of the filters as the filters drain. The air-locks can occur when a container, such as a water pitcher, water container, or a filter cartridge, for example, is emptied, and the water level in the container is no longer in contact with the filter, or when the water level is simply below the top of the filter. When water is later poured into the top of the filter, air in the filter can become trapped in-between particles of the filtration media in the filter and creates an air lock. The air lock provides a back pressure and a loss of filtration surface area, both of which reduce the flow rate of the liquids through the filter.

The water table retention filtration process and associated filtration devices of the claimed invention eliminate the air locks and the resulting clogging by maintaining a constant water table at or near the top of the filter so that air is not drawn into the top of the filter as the filter drains. The claimed invention further includes a water filtration device that removes a broad range of contaminants and that can be gravity-fed or pressure-fed. The water filtration device of the claimed invention includes a filter that separates or removes organic, inorganic, radiological, and microbiological contaminants from unfiltered input water.

By eliminating air-locks from the filtration process, the claimed invention provides a controlled flow rate of filtered water from the filtration device. For example, by eliminating air-locks from the water filtration device, with a water head of 75 mm, a flow rate of water of 180-200 ml/min can be achieved. One example filtration device can include a micron filter layer, a mixed bed ion exchange, a separator, a redox alloy, a carbon layer, and a screen or mesh separator.

Different geometries of the filtration device can be employed depending upon the particular application in which the filtration device will be used. For example, one embodiment of the filtration device includes a water head layer that facilitates the flow of water downward through filtration media of a filtration device and then back upward through cavities before exiting the filtration device. Another example embodiment includes a water head layer that flows downward through an open flow tube and then back upward through the filtration media of the filtration device before exiting through a water outlet.

The claimed invention includes a water table retention filter cartridge as well as air lock eliminating water treatment apparatuses that incorporate the water table retention filter cartridge. The water table retention filter cartridge includes a water head layer, a filter layer, a cavity, and a water outlet. The water head layer receives unfiltered water and facilitates flow of water through a filtration medium. The filter layer houses the filtration medium that filters the water as the water passes through. The cavity receives filtered water that passes through the filter layer and redirects the filtered water to the top of the water retention filter cartridge. The cavity retains a constant water table at the water head layer such that air is not drawn into the water head layer of the filter cartridge as the cartridge drains. The water outlet can be positioned at the top of the water retention filter cartridge and receive the filtered water from the cavity. The water outlet can be positioned at other locations on the filter cartridge as well. In any case, the filtered water passes through the water outlet and exits the water retention filter cartridge.

The filtration medium of the water table retention filter cartridge can include a number of layers. For example, the filtration medium can include an organic element and oxidation reduction filter layer, such as a carbon layer for removing chlorine and/or organic contaminants from the unfiltered water. The filtration medium can also include a mold and mildew prevention layer, such as redox alloy layer that neutralizes pH in the water. Additionally, the filtration medium can include a separator or a screen configured to evenly distribute water across the surface area of the filtration medium to eliminate channeling within the filtration medium. The filtration medium can also include an inorganic element filter layer, such as an ion exchange layer for removing inorganic and/or radiological contaminants in the water. The ion exchange layer can include a mixed bed of cationic and anionic resins. Likewise, the ion exchange layer can include a water softener.

The water table retention filter cartridge can be configured to provide a flow rate of filtered water of 180-200 ml/min for a water head layer of 75 mm.

One example embodiment includes a water table retention filter where the water (or other liquid) being filtered is re-directed to the top of the filter to the water head layer to avoid drawing air into the filter. The cavity of this water table retention filter cartridge can be located along an outer edge of the interior of the water table retention filter cartridge to direct the filtered water to the water outlet.

Another example embodiment includes a filter where the unfiltered water drains down the center of the filter to the water head layer and then flows up through the filter and is directed out near or at the top of the filter. In this example water table retention filter cartridge, an open flow tube is located along a central axis of the interior of the water table retention filter cartridge and is configured to deliver unfiltered water to the water head layer at the bottom of the water retention filter cartridge.

A method of eliminating air locks in a water retention filter cartridge and treating unfiltered water to remove organic, inorganic, and/or radiological contaminants from the unfiltered water uses the water table retention filter cartridge of the claimed invention to produce potable water suitable for human consumption. The method includes passing untreated water through the water table retention filter cartridge to produce potable water suitable for human consumption while eliminating air locks in the water retention filter cartridge. As outlined above, the water table retention filter cartridge includes a water head layer, a filter layer, a cavity, and a water outlet. The cavity receives filtered water that passed through the filter layer and redirects the filtered water to the water outlet while maintaining a constant water table at the water head layer so that air is not drawn into the water head layer as filter cartridge drains. This eliminates air locks in the water retention filter cartridge. Once the water passes through the filter cartridge and exits from the water outlet, the potable water is collected.

In passing untreated water through the water table retention filter cartridge, a variety of contaminants and impurities are removed. For example, the method includes removing chlorine and/or organic contaminants from the unfiltered water with a carbon layer in the filtration medium, neutralizing pH in the water with a redox alloy layer, removing inorganic and/or radiological contaminants in the water with an ion exchange layer, and eliminating discharge of the filtration medium into the output water and filtering out elements larger than one micron with a micron filter layer.

The method of eliminating air locks in the water retention filter cartridge and treating unfiltered water can also include removing impurities from water and regulating water flow through the filtration medium with a porous separator and/or a screen. The method of eliminating air locks in the water retention filter cartridge and treating unfiltered water can also include softening the water with a water softener in the ion exchange layer.

For the upward flowing cavities of the water retention filter cartridge, the method of eliminating air locks and treating unfiltered water can include a cavity that provides the filtered water to the water outlet along an outer edge of the interior of the water table retention filter cartridge.

For the downward flowing embodiment incorporating a downward central open flow tube, the method of eliminating air locks in the water retention filter cartridge and treating unfiltered water, passing the untreated water can include delivering the unfiltered water to the water head layer at the bottom of the water retention filter cartridge through an open flow tube located along a central axis of the interior of the water table retention filter cartridge.

The claimed water table retention filters can be integrated into containers that house and store filtered water to form air lock eliminating water treatment apparatuses. These water containers can be in fluid communication with the water table retention filter cartridge to receive and collect the filtered water from the water outlet on the filter. The filter removes organic, inorganic, and radiological contaminants from the unfiltered water to produce potable water. The filtered, potable water can be stored in the water container for future use. Example water containers that can be integrated with the water table retention filters of the claimed invention include pitchers, travel bottles, sports bottles, water coolers, water jugs, and water bottles.

DETAILED DESCRIPTION

Figure 1:
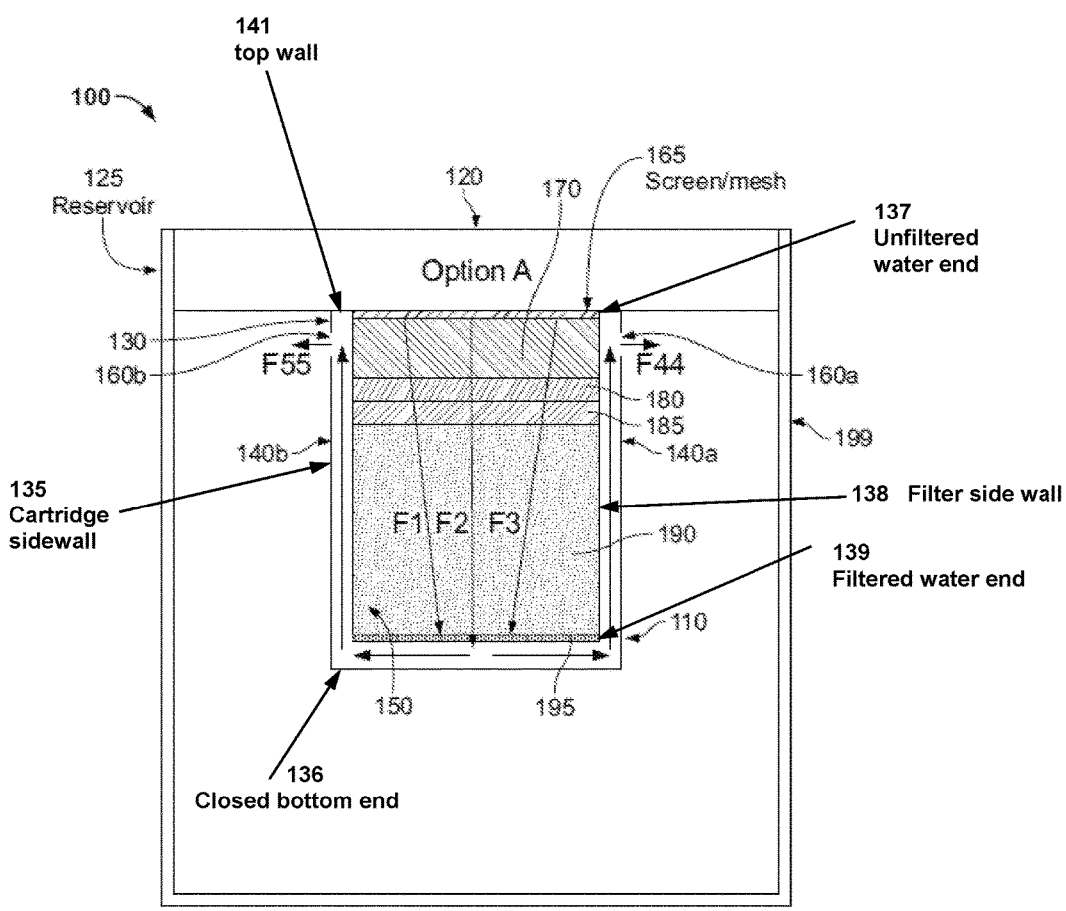
FIG. 1 illustrates an example water treatment apparatus in accordance with the claimed invention, including a container and a filter cartridge.

A number of example embodiments in accordance with the claimed invention can be used to provide liquid filtration while eliminating air-locks and clogging. One example system 100 is shown in FIG. 1 and includes a container 199, such as a water pitcher. The filter system 100 includes a filter cartridge 110, where the water (liquid) 120 under filtration is redirected to the top 130 of the filter to avoid drawing air into the filter cartridge 110. In the example embodiment of the claimed invention shown in FIG. 1 and FIG. 1 A, the water (liquid 120) flows through a filtration medium 145 in an encased filter cavity 150 along flow paths Fl, F2, and F3 through filter elements, such as screen/mesh 165, carbon layer 170, redox alloy layer 180, separator 185, ion exchange resin layer 190, and micron filter layer 195. Upon exiting the last filtration layer of the filter cavity 150, the filtered water is then re-directed toward the top 130 of the filter cartridge 110 through one or more outlet cavities 140a, 140b or tubes that allow the water 120 to flow upward along flow paths F44, F55 to near the top 130 of the filter cartridge 110. The amount of water contained in the outlet cavities 140a, 140b or tube is minimal, such that when the water in the outlet cavities 140a, 140b drains as the container 199 is tilted (such as when a pitcher is used to pour out the filtered water) the volume of the outlet cavity 140a, 140b has little effect on draining water out of the filter cavity 150 as it maintains a constant water table in the filter cavity 150. As shown in FIG. 1, the filter cartridge 110 includes a cartridge sidewall 135 having an open top end and a closed bottom end 136, wherein the open top end of the cartridge sidewall 135 receives unfiltered water and that opens into an encased filter cavity. The encased filter cavity 150 is defined by a filter sidewall 138 disposed within the cartridge sidewall 135, the filter sidewall 138 having an unfiltered water end 137 located at the open top end of the cartridge sidewall 135 and a filtered water end 139 spaced above the closed bottom end 136 of the cartridge sidewall 135. The filter sidewall 138 houses the filter elements and receives unfiltered water at the unfiltered water end 137 from the open top end of the cartridge sidewall 135 and filters the water as the water passes through the filter elements. An outlet cavity 140a, 140b is formed between the filtered water end 139 of the filter sidewall and the closed bottom end 136 of the cartridge sidewall 135 and extends between the filter sidewall 138 and the cartridge sidewall 135 to a top wall 141 located at a top of the filter cartridge 110, wherein the outlet cavity receives filtered water that passes through the filter elements and redirects the filtered water to the top of the cartridge such that air is not drawn into the outlet cavity 140a, 140b and does not migrate to the encased filter cavity 150. The filter cartridge 110 includes plurality of water outlets 160a, 160b positioned at an upper portion of the cartridge sidewall 135 proximate to and below the top wall 141, wherein the plurality of water outlets 160a, 160b receive the filtered water from the outlet cavity 140a, 140b and through which the filtered water exits the filter cartridge.

The water 120 flows upward along flow paths F44, F55 toward the top 130 of the filter cartridge 110. In one example embodiment, the outlet cavities 140a, 140b (and therefore the flow paths F44, F55) can be located along the outer edge of the interior of the filter cartridge as shown in a cross sectional top view of the filter cartridge 110 in FIG. 1A. The filter cartridge 110 is also designed and manufactured such that the water outlet(s) 160a, 160b at or near the top 130 of the filter 110 can be positioned so that the water outlet(s) 160a, 160b face the rear of the pitcher (container 199) or opposite a spout, so when the pitcher (container 199) is poured, minimal water drains from the tubes or outlet cavities 140a, 140b to further ensure minimal impact on the water table level in the cavity 150 of the body of the filter cartridge 110. Likewise, in an alternative example embodiment of the claimed invention employing a single outlet cavity 140, for example on a side opposite a spout of the pitcher (container 199), any air trapped in the outlet cavity 140 will not travel to the bottom of the outlet cavity 140 as the pitcher is tilted or poured.

Figure 1A:
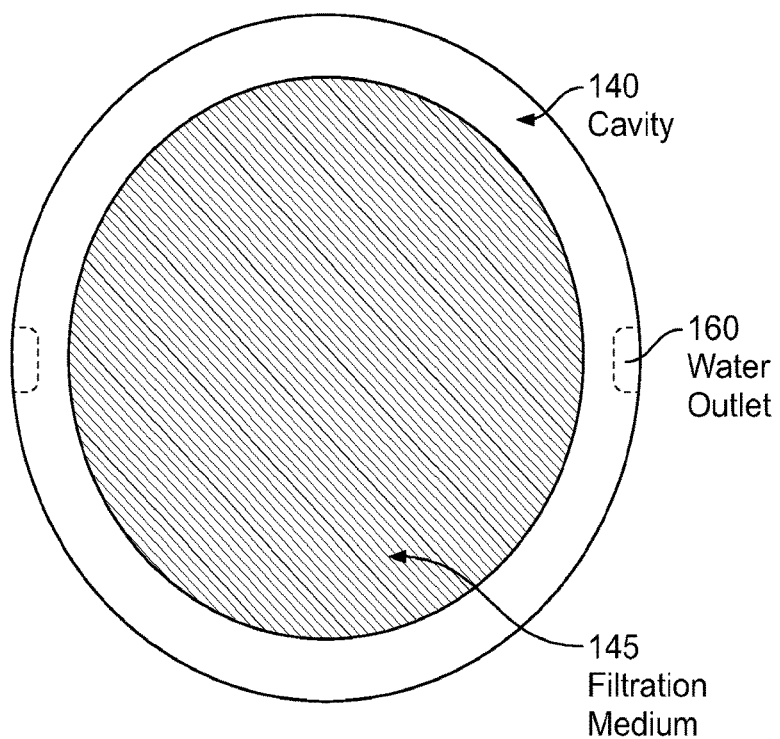
FIG. 1A shows a cross-sectional top view of one example embodiment of a filter cartridge in accordance with the claimed invention where the unfiltered water flows downward through a filtration medium and the cavity is located along the outer edge of the interior of the filter cartridge.

With the example embodiment shown in FIG. 1 and FIG. 1A, the claimed invention eliminates air locks in filter cartridge 110. As unfiltered water 120 is added to reservoir 125, the weight of the unfiltered water 120 and gravity provide a force to move the unfiltered water 120 through the filtration medium 145 and through the filter cartridge 110. The force of the weight of the unfiltered water 120 and gravity serve to move the unfiltered water 120 through successive filtration media layers 165, 170, 180, 185, 190, 195 of the filter cartridge 110 until the previously unfiltered water exits the last filtration media layer of the filter cavity 150 as filtered water. The filtered water is directed along flow paths F44 and F55 to water outlets 160a, 160b where the filtered water exits the filter cartridge 110 and collects on the bottom of container 199. In those configurations where a filter cartridge is used without a container, the filtered water exits the filter cartridge and can be transferred, stored, consumed, and the like. The forces of gravity and the weight of the unfiltered water exert a downward force on the filtration medium 145 in the filter cavity 150 such that air cannot be brought back into cavities 140a, 140b and migrate back through the filter cavity 150. As additional unfiltered water is added to reservoir 125 and to the water head layer, the water's weight and gravity feed the unfiltered water through the filter cavity 150 of the filter cartridge 110. Any air remaining in cavities 140a, 140b is displaced through water outlets 160a, 160b. In this fashion, the filter system of the claimed invention eliminates air locks that have previously contributed to poor filtration and poor filter performance and provides a controlled flow rate of filtered water from the filtration device.

Figure 2A:
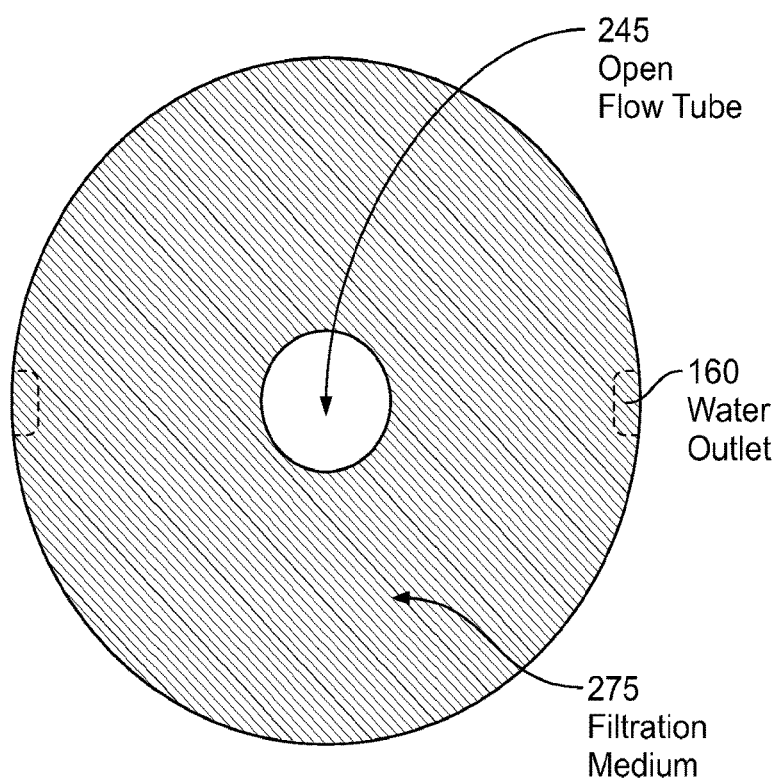
FIG. 2A shows a cross-sectional top view of one example embodiment of a filter cartridge in accordance with the claimed invention where the unfiltered water flows through an open flow tube along the central axis of the filter cartridge and upward through a filtration medium.
Figure 2:
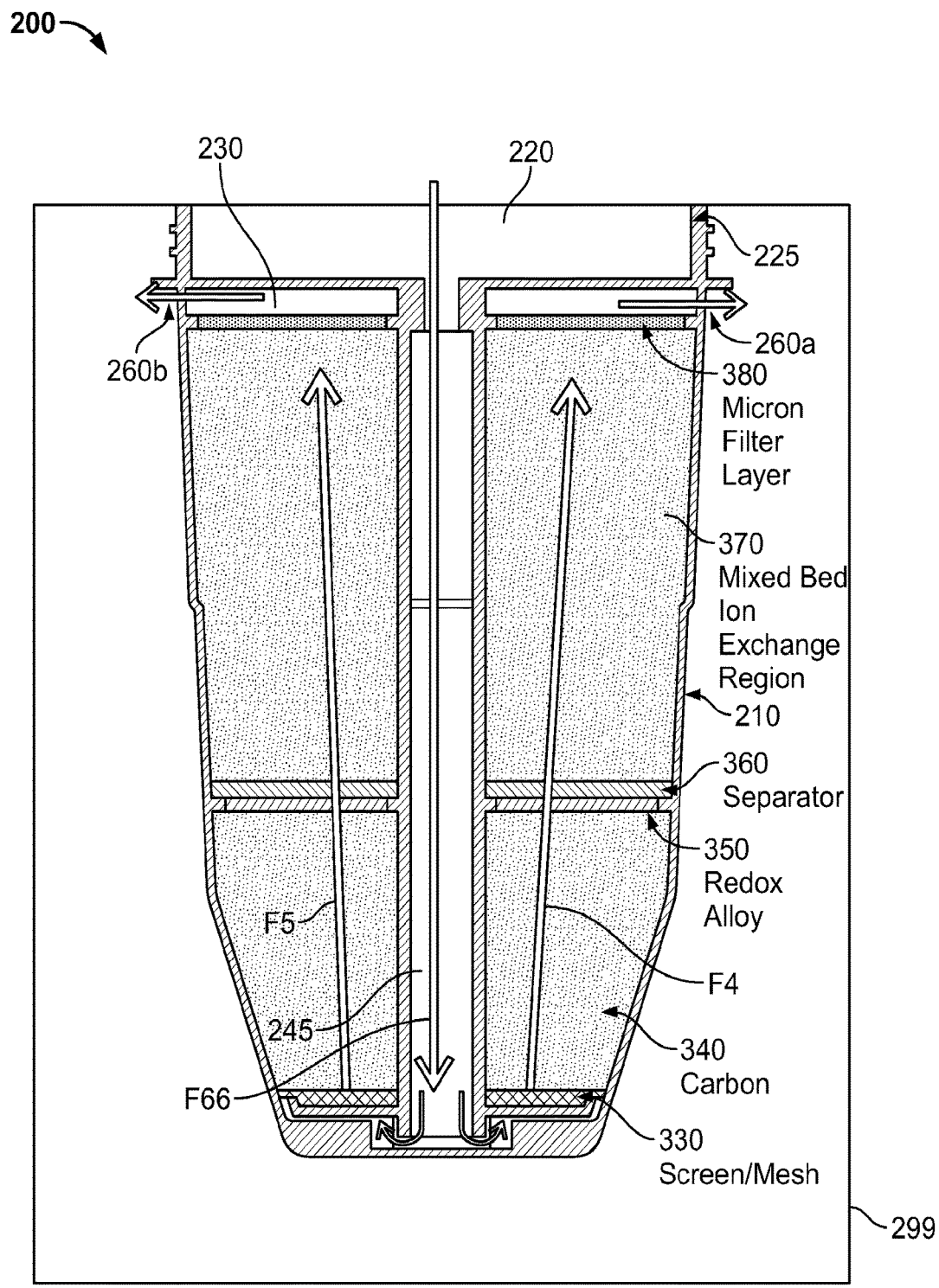
FIG. 2 illustrates another example embodiment of a water treatment apparatus in accordance with the claimed invention.

Another example embodiment of the claimed invention for eliminating air locks in a filter is shown in FIGS. 2 and 2A. By maintaining a constant water table at or near the top 230 of the filter cartridge 210, air is not drawn into the top 230 of the filter cartridge 210 as the filter cartridge 210 drains, and air locks are eliminated. Another example embodiment of the claimed invention includes a filter and pitcher designed and manufactured such that the water covers the filter but does not span the entire reservoir as shown in FIG. 2. One example embodiment such as this is designed and manufactured when the filter cartridge sits slightly below the bottom of the reservoir holding the unfiltered water. For example, as shown in FIG. 2, the water table retention system 200 is similar to the system 100 shown in FIG. 1, but includes an inverted flow path. That is, water 220 drains down the center of the filter 210 along flow path F66 in an open flow tube 245, and then flows up through a filtration medium 275 between the flow chamber bordered by the flow tube 245 and the outer wall of the filter 210 as indicated by flow paths F4 and F5. In this example embodiment, the open flow tube 245 (and therefore the flow path F66) can be located along the central axis of the interior of the filter cartridge as shown in a cross sectional top view of the filter cartridge 220 in FIG. 2A. As the water flows upward along flow paths F4 and F5, the water flows through filter media 330, 340, 350, 360, 370, 380 (described further below). This configuration provides a continuous flow path (similar to a cylindrical donut) up through the filter cartridge 210, and then the filtered water drains out of the top 230 of the filter 210 at water outlets 260a, 260b inside the water pitcher (container 299). The filtration elements, such as screen/mesh 330, carbon layer 340, redox alloy layer 350, separator 360, mixed bed ion exchange resin layer 370, and micron filter layer 380 of the filter cartridge are reversed in their order (compared to the example shown in FIG. 1) so that the water follows the same order of filtration as the filter 110 shown in FIG. 1. With this flow pattern shown in FIG. 2, it is possible to further reduce infiltration of the unfiltered water 220 in reservoir 225 with the filtered water in the container 299 when pouring the pitcher (container 299).

Figure 3:
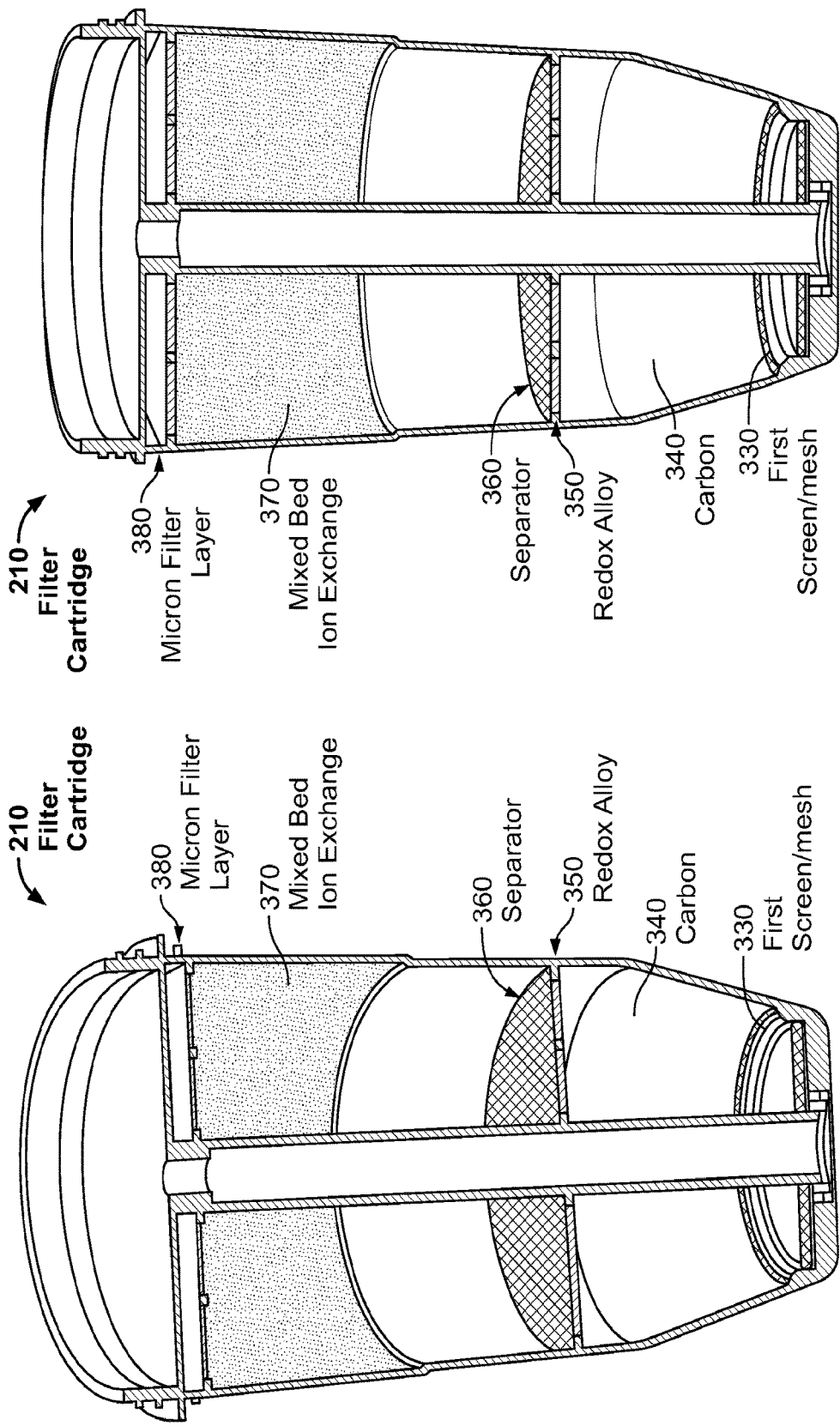
FIGS. 3A and 3B show cross sectional views of a filter cartridge in accordance with the claimed invention.

With the example embodiment shown in FIGS. 2, 3A, and 3B, the claimed invention eliminates air locks in filter cartridge 210. As unfiltered water 220 is added to reservoir 225, the weight of the unfiltered water 220 and gravity provide a force to move the unfiltered water 220 through the filter cartridge 210. The force of the weight of the unfiltered water 220 and gravity serve to move the unfiltered water 220 downward through open flow tube 245 and then back up through successive filtration media layers 330, 340, 350, 360, 370, 380 of the filter cartridge 210 until the previously unfiltered water exits the last filtration media layer of the filter cartridge 210 as filtered water. The filtered water exits filter cartridge 210 through water outlets 260a, 260b and collects on the bottom of container 299. The forces of gravity and the weight of the unfiltered water exert a downward force through open flow tube 245 that forces the unfiltered water upward through the filtration media in the filter cartridge. At the end of the filtration process, water remains in the open flow tube 245, and no air is introduced into the filtration media. Likewise, air cannot be brought back into the filter media via water outlets 260a, 260b because the air is lighter than any water remaining in the filter media. In this fashion, the filter system of the claimed invention eliminates air locks that have previously contributed to poor filtration and poor filter performance and provides a controlled flow rate of filtered water from the filtration device.

Filter Layers

As shown in the Figures, filter cartridges 110, 210 can be manufactured as polypropylene outer cases within which the filter media are housed. Though the discussion below and the exemplary figures refer to certain filter media for the exemplary embodiments, any filter media (media known for purification and treatment of water) or combinations of filter media known in the art can be used in accordance with the claimed invention. The filter media is chosen based upon the requirements of the water purification quality. The filter media can be chosen from sorption media (e.g., activated carbon, synthetic zeolite, schungite, and the like); ion exchange media (e.g., ion exchange resins and the like), porous media (e.g., polypropylene, porous glass beads or frits, filter paper, and the like), catalytic media (e.g., KDF and the like), a disinfecting resin (e.g., iodine resin and the like) and mixed media combining properties of media of different compositions. Filter media can be selected and used to remove impurities such as bacteria, heavy metals, chlorine, organic impurities, inorganic impurities, radiological impurities, and the like. The filter media can be in the form of beads, powders, granules, formed between porous membranes or other forms. Examples of such filter media are described in U.S. Pat. Nos. 8,252,185; 7,413,663; 7,276,161; 7,153,420; 6,752,768; and 5,635,063; all of which are incorporated herein by reference in their entirety. The filter media can be separated into individual layers or mixed together as a whole or with different combinations of filter media included as different layers. The filters of the claimed invention can include more than one layer of a particular filter media or filter media mixture.

FIG. 1 illustrates an example embodiment of the claimed invention where water flows through the various filter media 170, 180, 190, 195 from top to bottom, and the filtered water is directed out of water outlets 160a, 160b via cavities 140a, 140b while maintaining a constant water table at the water head layer such that air is not drawn into the water head layer at the top of the filter as the water retention filter cartridge drains.

FIGS. 2, 3A, and 3B show cross sectional views of a filter cartridge 210 where water flows down the center of the filter 210 along flow path F66 in an open tube 245, and then flows up through filter media 330, 340, 350, 360, 370, 380 as indicated by flow paths F4 and F5. The filtered water is then directed out of water outlets 260a, 260b while maintaining a constant water table at the water head layer such that air is not drawn into the water head layer at the bottom of the filter as the water retention filter cartridge drains.

The example filter 210 of the claimed invention shown in FIGS. 2, 3A, and 3B is designed and manufactured with a number of filtration layers and screens or mesh separators that are inverted in comparison to the example of FIG. 1. For example, as shown in FIGS. 2, 3A, and 3B, a first screen or mesh 330 is provided at the bottom of the filter cartridge 210 and is designed and manufactured to evenly distribute the water across the surface area of the filter layers (water head layer). One example of the screen/mesh is a polypropylene screen. The even flow of water through the filter prevents channeling within the filter cartridge 210 where the water or other liquid can pass through the least resistant path of the filter medium with reduced contact time with the components of the filter medium.

Figure 4:
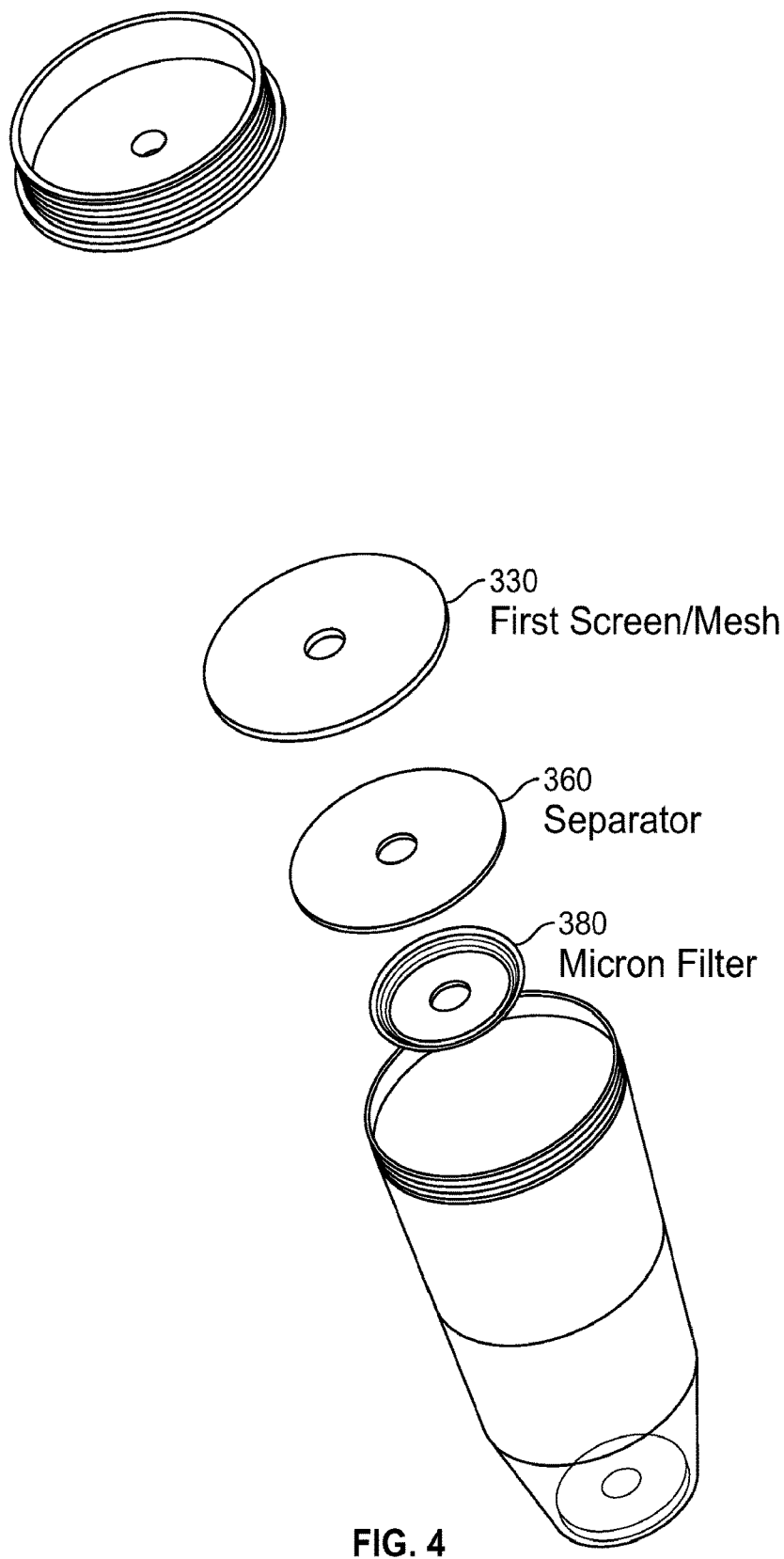
FIG. 4 shows an exploded view of a filter cartridge in accordance with the claimed invention.
Figure 5A:
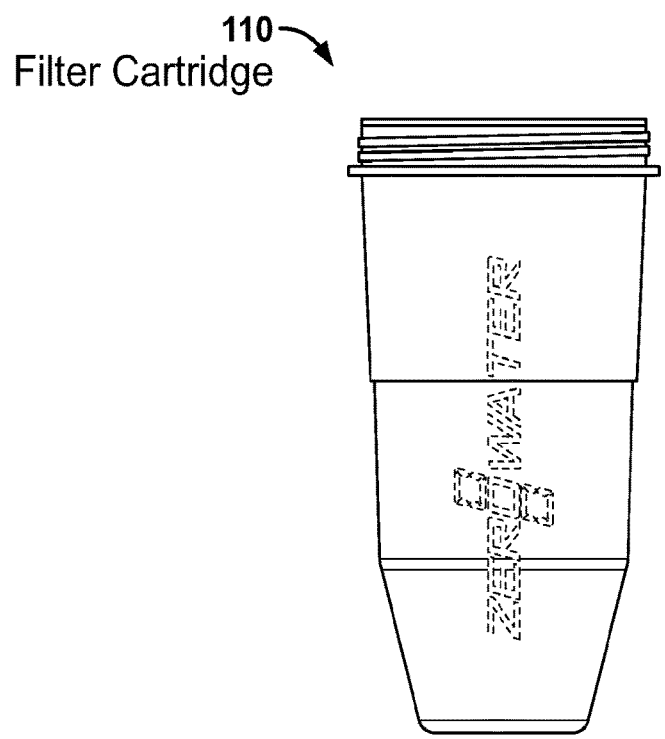
FIGS. 5A and 5B show a front perspective view and side perspective view, respectively, of a filter cartridge in accordance with the claimed invention.
Figure 5B:
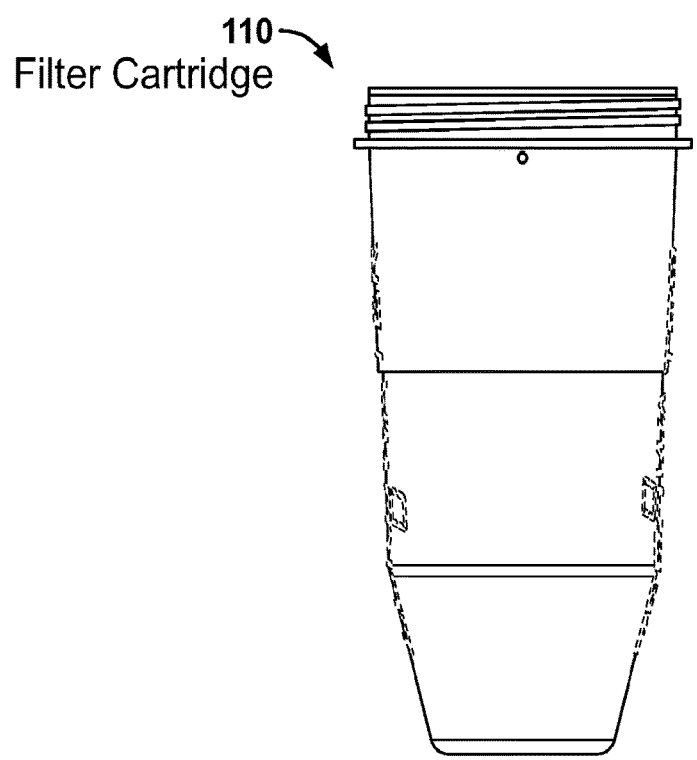

As shown in FIGS. 3A and 3B, the first screen/mesh 330 is also designed and manufactured to contain the overlying layers of filtration media and to prevent the overlying layers of filtration media from shifting. For those systems using a top-down filtration scheme, for example as depicted in FIG. 1, the first screen/mesh 165 is positioned near the top of the filter cartridge 110 as opposed to the bottom-up filtration scheme depicted in FIGS. 3A and 3B. Similarly, the other filter layers and screens/meshes described below can also be placed in an inverted position in filter cartridges employing a top-down filtration scheme. For example, an alternative configuration of the first screen/mesh (and other dividers and separators) corresponding to the downward flowing example shown in FIG. 1 is shown in an exploded view in FIG. 4.

As shown in FIGS. 2, 3A, and 3B, the first screen/mesh 330 is positioned at the bottom of the filter cartridge 210 and subsequent filter media layers (e.g., carbon 340, redox alloy 350, separator 360, mixed bed ion exchange resin 370, micron filter layer 380) are positioned above the first screen/mesh 330. The relative positions of the screen/mesh and other filtration media layers can be altered based upon the desired filtration effects and the application. In the example filter cartridges discussed below, the individual filtration media layers are outlined in the order in which unfiltered water encounters the layers, regardless of whether the filter cartridge is manufactured as a top-down flow filter (e.g., FIGS. 1 and 4) or a bottom-up flow filter (e.g., FIGS. 2, 3A, 3B).

As shown in FIGS. 2, 3A, and 3B, activated carbon layer 340 is incorporated in the filter cartridge 210. The activated carbon layer 340 can be positioned as a beginning filter stage in the filter cartridge 210. For example, the activated carbon layer 340 can be placed at or near the very beginning of the filtering process. The activated carbon layer 340 is designed and manufactured to remove organic elements from the unfiltered water. The activated carbon layer 340 can be a powdered, granular, or carbon block material.

A redox alloy layer 350 is also incorporated in the filter cartridge 210. The redox alloy layer 350 can be positioned immediately after the carbon layer 340, or it could be mixed into the carbon layer 340. The redox alloy layer 350 is designed and manufactured to prevent the growth of mold, mildew, and bacteria in the water, in the filter cartridge, and in the filter materials. One example of the redox alloy layer 350 includes a KDF (kinetic degradation fluxion) alloy, or other high purity alloys of copper and zinc. One example of the redox alloy layer includes flaked or granulated particulates.

As shown in FIGS. 2, 3A, and 3B, a separator 360 can be used after the redox alloy layer. Separator 360 is designed and manufactured to diffuse the water as it is filtered and to evenly distribute the water across the surface area of the filter layers. By evenly distributing water across the surface area of the filter layers, channeling within the filter cartridge 210 can be prevented. Channeling occurs when the water or other liquid passes through a less-resistant path of the filter media. That is, a channel is formed within the filter media by repeated flow through a particular area with reduced contact time with the components of the filter media. One example separator used in one example embodiment of the claimed invention is a polypropylene screen. The separator 360 is also designed and manufactured to contain the overlying/underlying layers of filtration media and to prevent the overlying and underlying layers of filtration media from co-mingling. An alternative configuration of the separator (and other dividers and screen/mesh) corresponding to the downward flowing example shown in FIG. 1 is shown in an exploded view in FIG. 4.

A mixed bed ion exchange resin 370 is also included in the filter cartridge 210. The mixed bed ion exchange resin 370 is designed and manufactured to eliminate inorganic elements among other things. One example of the mixed bed ion resin includes porous beads or other porous structures with large surface area per volume characteristics. One example mixed bed ion resin in accordance with the claimed invention includes approximately one-half anions and one-half cations. The mixed bed ion resin includes a highly developed structure of pores. On the surface of the pores, there are sites with easily trapped and released ions. The trapping of ions takes place with simultaneous releasing of other ions. That is the ion-exchange. Cations can be replaced with hydrogen ions, and anions can be replaced with hydroxyls. The hydrogen ions and the hydroxyls can recombine producing water molecules.

A micron filter layer 380 is also included in the filter cartridge 110. In the examples shown in FIGS. 2, 3A, and 3B, the micron filter layer 380 is a one micron filter, such as non-woven one micron cloth, for example. The micron filter layer 380 is often positioned at the end of the filtration process, however, the micron filter layer 380 can also be placed at other positions (stages) in the filter cartridge 210, such as at the very beginning. The micron filter layer 380 is designed and manufactured for a dual purpose. The micron filter layer 380 eliminates the discharge of carbon dust or other filtration media into the output water and further filters out elements larger than one micron, such as cysts, contaminants, and other elements, for example. The micron filter layer 380 also provides an additional level of stability and containment of the filtration media as it helps prevent the filtration media from shifting and otherwise mixing or commingling.

Additional dividers can also be added between the filter layers to further eliminate inter-mixing of filter media and to further promote the even flow of water through the filter. As outlined above, the even flow of water through the filter prevents channeling within the filter.

The example embodiments of the claimed water table retention filters prevent clogging of the filters due to air-locks that can otherwise occur in the filter when air is drawn in as the filter drains. The water table retention filtration process and associated filtration devices of the claimed invention eliminates the air locks and clogging by maintaining a constant water table at the top of the filter so that air is not drawn into the top of the filter as the filter drains.

Figure 6:
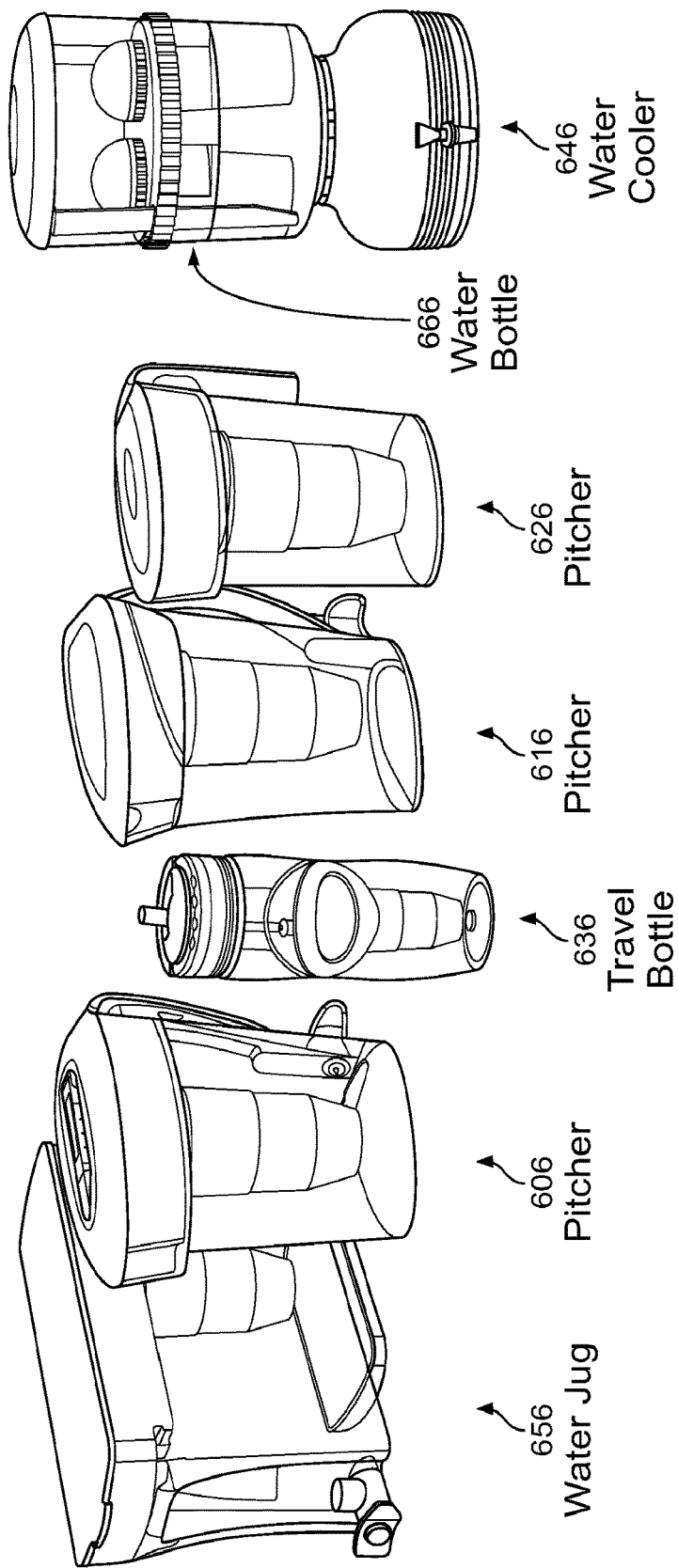
FIG. 6 shows a number of example water containers and integrated water table retention filters in accordance with the claimed invention.

The claimed water table retention filters can be integrated into containers that house and store filtered water to form air lock eliminating water treatment apparatuses. These water containers can be in fluid communication with the water table retention filter cartridge to receive and collect the filtered water from the water outlet on the filter. The filtered water can be stored in the water container for future use. As shown in FIG. 6, some example water containers that can be integrated with the water table retention filters of the claimed invention include pitchers 606, 616, 626, travel bottles 636, sports bottle, a water cooler 646, a water jug 656, and a water bottle 666.

We claim:

1. A water table retention filter cartridge comprising:
a cartridge sidewall having an open top end and a closed bottom end, wherein the open top end of the cartridge sidewall receives unfiltered water and that opens into an encased filter cavity;
wherein the encased filter cavity is defined by a filter sidewall disposed within the cartridge sidewall, the filter sidewall having an unfiltered water end located at the open top end of the cartridge sidewall and a filtered water end spaced above the closed bottom end of the cartridge sidewall, wherein the filter sidewall houses filter elements and receives unfiltered water at the unfiltered water end from the open top end of the cartridge sidewall and filters the water as the water passes through the filter elements;
an outlet cavity formed between the filtered water end of the filter sidewall and the closed bottom end of the cartridge sidewall and extending between the filter sidewall and the cartridge sidewall to a top wall located at a top of the filter cartridge, wherein the outlet cavity receives filtered water that passes through the filter elements and redirects the filtered water to the top of the cartridge such that air is not drawn into the outlet cavity and does not migrate to the encased filter cavity; and
a plurality of water outlets positioned at an upper portion of the cartridge sidewall proximate to and below said top wall, wherein the plurality of water outlets receive the filtered water from the outlet cavity and through which the filtered water exits the filter cartridge.

2. The water table retention filter cartridge of claim 1, wherein the filter elements comprises:
a carbon layer for removing at least one of chlorine or organic contaminants from the unfiltered water;
a redox alloy layer for neutralizing pH in the water;
an ion exchange layer for removing at least one of inorganic and radiological contaminants in the water; and
a micron filter layer.

3. The water table retention filter cartridge of claim 2 further comprising:
a porous separator for evenly distributing water across a surface area of the filter elements.

4. The water table retention filter cartridge of claim 2, wherein the ion exchange layer includes a mixed bed of cationic and anionic resins.

5. The water table retention filter cartridge of claim 2, wherein the ion exchange layer includes a water softener.

6. The water table retention filter cartridge of claim 1, wherein the cartridge provides a flow rate of filtered water of 180-200 ml/min.

7. The water table retention filter cartridge of claim 1, wherein the filter elements comprises:
an organic element and oxidation reduction filter layer; a mold and mildew prevention layer;
a separator configured to evenly distribute water across the surface area of the filtration medium to eliminate channeling within the filtration medium;
an inorganic element filter layer; and
a micron filter layer.

8. A method of eliminating air locks in a water retention filter cartridge and treating unfiltered water to remove at least one of organic, inorganic, and radiological contaminants from the unfiltered water to produce potable water suitable for human consumption, the method comprising:
(a) passing untreated water through the water table retention filter cartridge configured to remove at least one of organic, inorganic, and radiological contaminants from untreated liquid water to produce potable water suitable for human consumption while eliminating air locks in the water retention filter cartridge, the water table retention filter cartridge comprising:
a cartridge sidewall having an open top end and a closed bottom end, wherein the open top end of the cartridge sidewall receives unfiltered water and that opens into an encased filter cavity;
wherein the encased filter cavity is defined by a filter sidewall disposed within the cartridge sidewall, the filter sidewall having an unfiltered water end located at the open top end of the cartridge sidewall and a filtered water end spaced above the closed bottom end of the cartridge sidewall, wherein the filter sidewall houses filter elements and receives unfiltered water at the unfiltered water end from the open top end of the cartridge sidewall and filters the water as the water passes through the filter elements;
an outlet cavity formed between the filtered water end of the filter sidewall and the closed bottom end of the cartridge sidewall and extending between the filter sidewall and the cartridge sidewall to a top wall located at a top of the filter cartridge, wherein the outlet cavity receives filtered water that passes through the filter elements and redirects the filtered water to the top of the cartridge such that air is not drawn into the outlet cavity and does not migrate to the encased filter cavity; and
a plurality of water outlets positioned at an upper portion of the cartridge sidewall proximate to and below said top wall, wherein the plurality of water outlets receive the filtered water from the outlet cavity and through which the filtered water exits the filter cartridge, thereby producing potable water suitable for human consumption; and
(b) collecting the potable water that exits through the water outlets.

9. The method of eliminating air locks in the water retention filter cartridge and treating unfiltered water of claim 8, wherein passing untreated water through the water table retention filter cartridge includes:
removing at least one of chlorine or organic contaminants from the unfiltered water with a carbon layer in the filter elements;
neutralizing pH in the water with a redox alloy layer;
removing at least one of inorganic and radiological contaminants in the water with an ion exchange layer; and
eliminating discharge of the filter elements into the output water and filtering out elements larger than one micron with a micron filter layer.

10. The method of eliminating air locks in the water retention filter cartridge and treating unfiltered water of claim 9 further comprising:
removing impurities from water and regulating water flow through the filter elements with a porous separator.

11. The method of eliminating air locks in the water retention filter cartridge and treating unfiltered water of claim 9, wherein the ion exchange layer includes a mixed bed of cationic and anionic resins.

12. The method of eliminating air locks in the water retention filter cartridge and treating unfiltered water of claim 9 further comprising:
softening the water with a water softener in the ion exchange layer.

13. The method of eliminating air locks in the water retention filter cartridge and treating unfiltered water of claim 9 further comprising:
providing a flow rate of filtered water of 180-200 ml/min.

14. The method of eliminating air locks in the water retention filter cartridge and treating unfiltered water of claim 8, wherein the filter elements comprises:
an organic element and oxidation reduction filter layer;
a mold and mildew prevention layer;
a separator configured to evenly distribute water across the surface area of filter elements to eliminate channeling within the filter elements;
an inorganic element filter layer;
and a micron filter layer.

15. An air lock eliminating water treatment apparatus capable of killing microbiological organisms while removing organic, inorganic, and radiological contaminants from water, the apparatus thereby discharging potable water therefrom, the apparatus comprising:
a water table retention filter cartridge including:
a cartridge sidewall having an open top end and a closed bottom end, wherein the open top end of the cartridge sidewall receives unfiltered water and that opens into an encased filter cavity;
wherein the encased filter cavity is defined by a filter sidewall disposed within the cartridge sidewall, the filter sidewall having an unfiltered water end located at the open top end of the cartridge sidewall and a filtered water end spaced above the closed bottom end of the cartridge sidewall, wherein the filter sidewall houses filter elements and receives unfiltered water at the unfiltered water end from the open top end of the cartridge sidewall and filters the water as the water passes through the filter elements;
an outlet cavity formed between the filtered water end of the filter sidewall and the closed bottom end of the cartridge sidewall and extending between the filter sidewall and the cartridge sidewall to a top wall located at a top of the filter cartridge, wherein the outlet cavity receives filtered water that passes through the filter elements and redirects the filtered water to the top of the cartridge such that air is not drawn into the outlet cavity and does not migrate to the encased filter cavity; and
a plurality of water outlets positioned at an upper portion of the cartridge sidewall proximate to and below said top wall, wherein the plurality of water outlets receive the filtered water from the outlet cavity and through which the filtered water exits the filter cartridge; and
a water container in fluid communication with the water table retention filter cartridge that receives the filtered water from the water outlets.

16. The air lock eliminating water treatment apparatus of claim 15, wherein the water container is at least one of a pitcher, a travel bottle, a sports bottle, a water cooler, a water jug, and a water bottle.

\* \* \* \* \*